(No Model.) 3 Sheets—Sheet 1.

J. R. BATE, S. H. SHADBOLT & G. R. & C. B. HOUGHTON.
MACHINE FOR CUTTING EXCELSIOR.

No. 495,239. Patented Apr. 11, 1893.

WITNESSES.
B. P. Wheeler
O. B. Baenziger

INVENTORS.
James R. Bate
Sydney H. Shadbolt
George R. Houghton
Charles B. Houghton
By Edgar S. Wheeler Atty.

THE NORRIS PETERS CO., PHOTO-LITHO., WASHINGTON, D. C.

(No Model.) 3 Sheets—Sheet 2.
J. R. BATE, S. H. SHADBOLT & G. R. & C. B. HOUGHTON.
MACHINE FOR CUTTING EXCELSIOR.
No. 495,239. Patented Apr. 11, 1893.
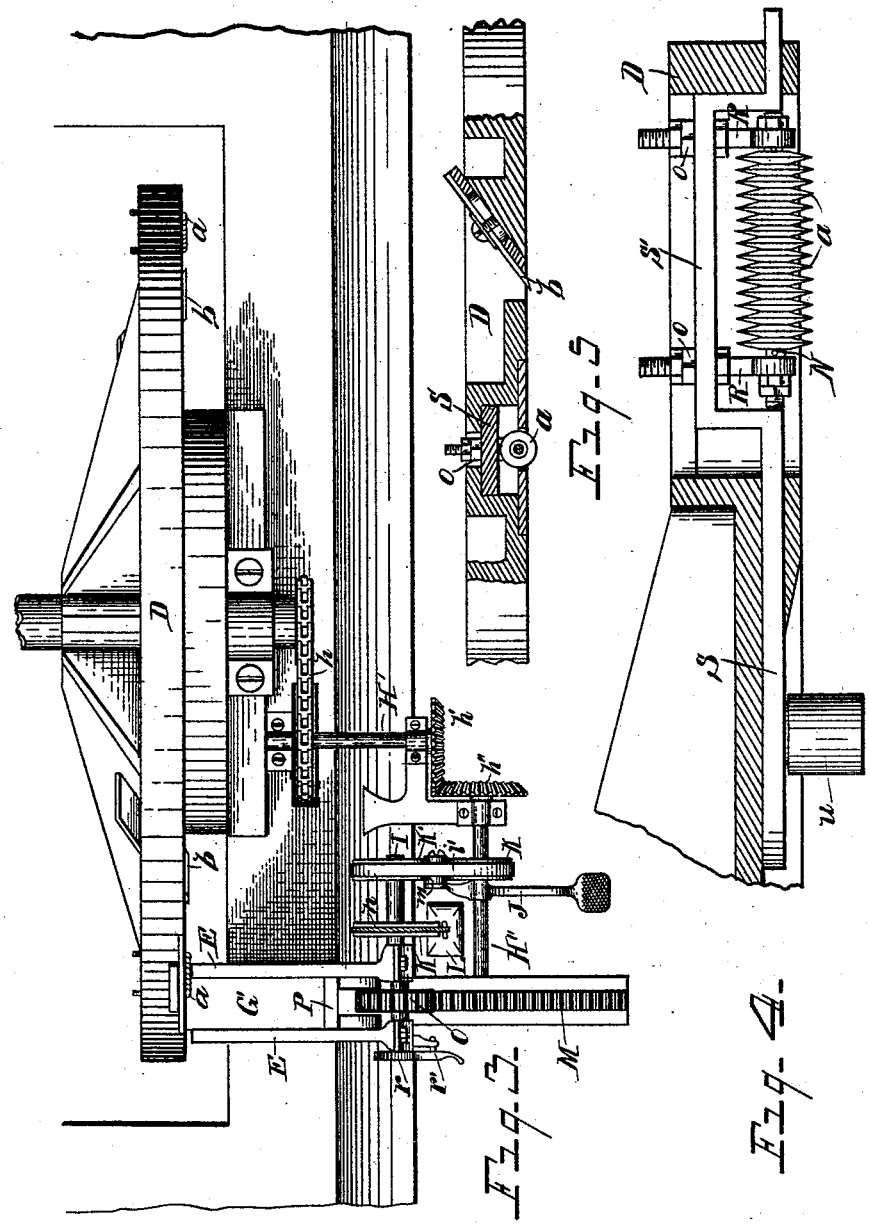

(No Model.) 3 Sheets—Sheet 3.
J. R. BATE, S. H. SHADBOLT & G. R. & C. B. HOUGHTON.
MACHINE FOR CUTTING EXCELSIOR.
No. 495,239. Patented Apr. 11, 1893.
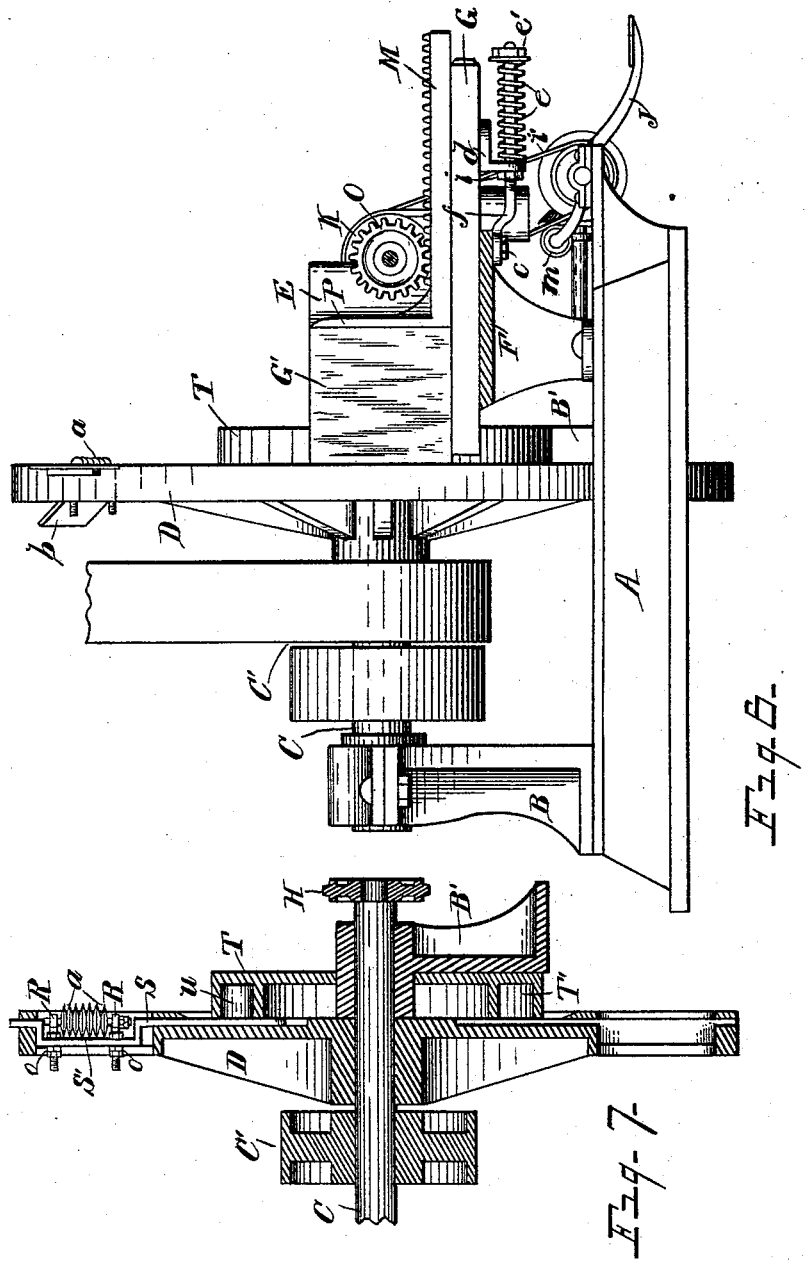

United States Patent Office.

JAMES R. BATE, SYDNEY H. SHADBOLT, GEORGE R. HOUGHTON, AND CHARLES B. HOUGHTON, OF CINCINNATI, OHIO, ASSIGNORS, BY MESNE ASSIGNMENTS, TO SAID BATE.

MACHINE FOR CUTTING EXCELSIOR.

SPECIFICATION forming part of Letters Patent No. 495,239, dated April 11, 1893.

Application filed March 12, 1892. Serial No. 424,677. (No model.)

*To all whom it may concern:*

Be it known that we, JAMES R. BATE and SYDNEY H. SHADBOLT, subjects of the Queen of Great Britain, and GEORGE R. HOUGHTON and CHARLES B. HOUGHTON, citizens of the United States, all residing at Cincinnati, in the county of Hamilton and State of Ohio, have invented certain new and useful Improvements in Machines for Cutting Excelsior; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in machines for cutting excelsior; and it consists in a certain construction and arrangement of parts, as hereinafter fully set forth, the essential features of which being pointed out particularly in the claims.

The object of the invention is to provide means, whereby the marking spurs or scorers are caused to reciprocate diametrically in the cutting wheel or revolving agent, when passing the fixed rest or receptacle that confines the blocks or bolts of wood, from which the excelsior is cut, so that at that point the spurs are diverted from the arc of the circle described by said wheel, and travel straight across the face of said block, thereby marking the strands of excelsior in a line with the grain thereof, and obviating the cross-grained strands when cut from the block, incident to rotary machines of this class, in common use. This object is obtained by the mechanism, illustrated in the accompanying drawings, in which:—

Figure 1:
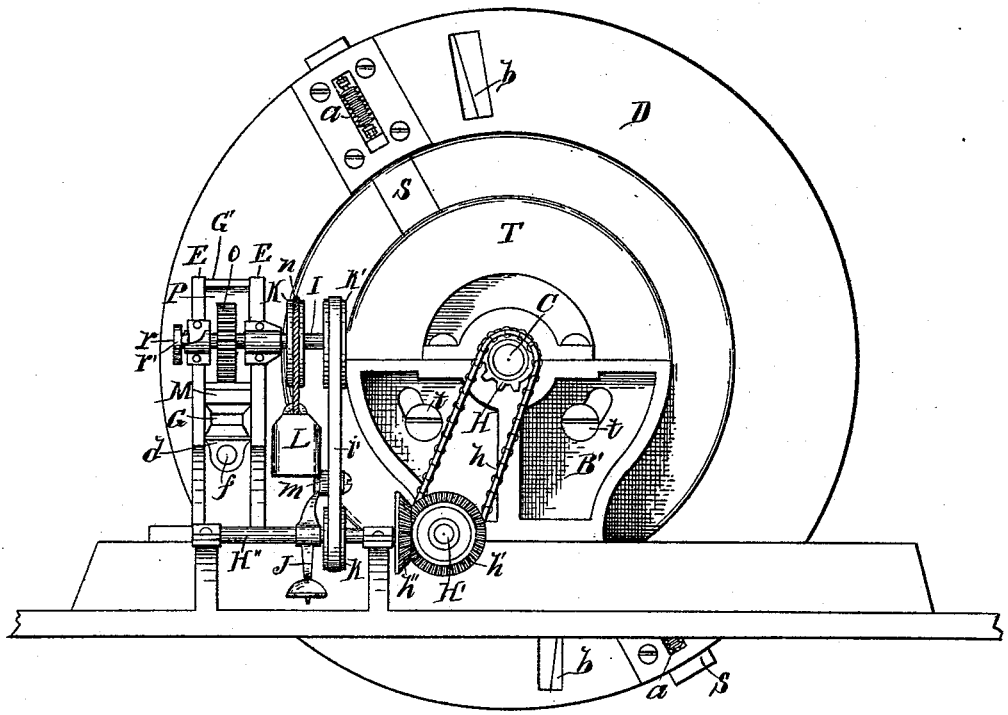
Figure 2:
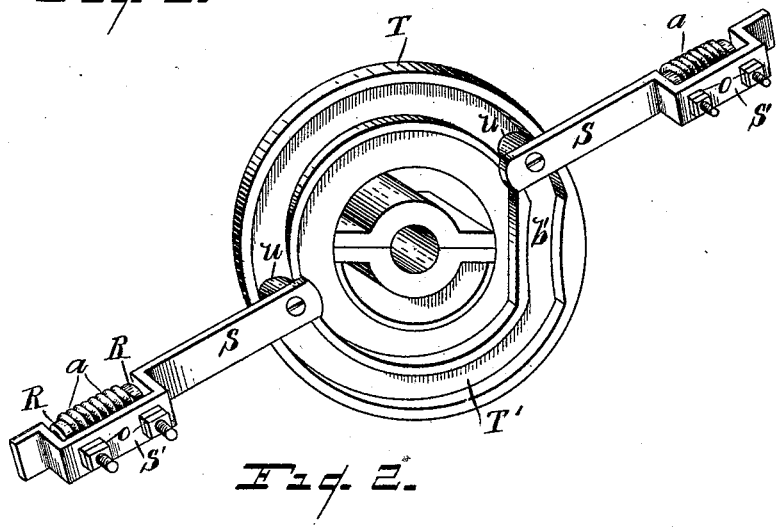

Figure 1, is a front elevation of our improved machine. Fig. 2 is an enlarged perspective of the circular plate having a cam-groove therein, and the reciprocating arms, carrying a series of revoluble disks or scorers. Fig. 3 is a plan view of Fig. 1. Fig. 4 is an enlarged section through a portion of the wheel, showing in elevation, the arms slidingly mounted therein and carrying the scoring disks. Fig. 5 is a section on dotted line of Fig. 1. Fig. 6 is a side elevation of the machine. Fig. 7 is a vertical section through the cutting wheel, and stationary cam-plate.

Referring to the letters of reference, A indicates a suitable base, upon which are mounted the pedestals B, B', having journaled therein the horizontal shaft C, carrying the cutting wheel D, said shaft also carrying the belt-pulleys C', through the medium of which the shaft is driven and said wheel revolved.

Located in the wheel, and extending slightly from the face thereof, is a series of knives b, of which there are two shown in the drawings, but the number of which may be increased, as desired. Also mounted in the wheel D, and in advance of each of the knives b, is a series of revoluble cutting disks a, that score the face of the block of wood and mark the strands of excelsior, removed by said knives.

The block retaining receptacle is composed of the side plates E provided with a bottom F, forming a box open at the top, and at both ends. The sides of said box or receptacle extend down to the base A and are secured thereto in such position that the discharge or feed end of said box stands adjacent to the face of the wheel D.

Slidingly supported on the bottom F of the block receptacle is a bed G upon which the block G' rests while being fed to the knives, as clearly shown in Fig. 6. Secured to the under face of the bed G, is a bracket d, provided with an aperture that freely receives the arm or rod f which passes therethrough. The inner end of said arm is rigidly secured at c to the bottom F of the block receptacle, and the outer end thereof is environed by the coiled spring e, which is confined between the nut e' on said arm, and the vertical face of the bracket f, said bracket, in turn, bearing against the nut i, which forms a stop therefor, and by the adjustment of which the space between the inner end of the bed, and the face of the wheel D, may be regulated. By means of the construction above described, the bed G is yieldingly held in place, whereby it is permitted to recede, should a splinter from the block become wedged between its inner end and the face of the wheel D, thereby obviating the chocking of said wheel.

On the end of the shaft C extending through the pedestal B', is a sprocket-wheel or belt pulley H, connected by the chain or belt h with a like wheel on the counter-shaft H', which is connected through the beveled gears h', h'', with the right-angle shaft H''. Mounted on the latter shaft is a belt-pulley k, that coincides with a like pulley k' on the parallel shaft I, which is journaled to the end of the block-receptacle. Passing around the pulleys k, k', is a slack belt i', and bearing against said belt is an idle pulley or roller m, journaled on the lever J which is fulcrumed to the shaft H'', whereby, by depressing said lever, the roller m is forced against the belt i', placing sufficient tension thereon to transmit the motion from the continuously revolving shaft H'', to the shaft I. Mounted on the latter shaft is a grooved pulley K around which passes a rope n to which is attached a weight L. Also mounted on the shaft I, between the sides E of the block receptacle, is a pinion O, that engages the rack M mounted on the bed G. Said rack extends into the block receptacle and is provided on its inner end with a follower P that bears against the block G', as clearly shown in Fig. 6. By this arrangement, the gravity of the weight L revolves the shaft I, driving the pinion O, and actuating the rack M to force the follower against the block G', thereby automatically feeding said block to the knives in the revolving wheel, as it is cut away. To withdraw the follower, so that another block may be placed in the feeding-box, the tread end of the lever J is depressed, which throws the roller n against the belt i', and causes the shaft I to revolve in the opposite direction, whereby, the rope is wound upon the pulley K to raise the weight L, and the pinion O is actuated to withdraw the rack and follower. On the outer end of the shaft I, is a ratchet-wheel r, adapted to be engaged by the detent r', whereby said shaft may be locked from rotation by the weight L, while a block is being placed in the box or feeding receptacle.

On referring to Fig. 4, it will be seen that the scoring disks a are mounted to rotate on a spindle or shaft N, supported by the hangers R secured to the cranked portion S' of the arm S, which is mounted to reciprocate, longitudinally, in the wheel D. Said hangers pass through said arm and receive on their threaded ends the nuts o, by which the hangers may be adjusted to regulate the depth of the score made in the block by said disks.

T indicates a circular plate, adjustably secured to the pedestal B' by means of the screws t, as shown in Fig. 1. The inner face of said plate, adjacent to the wheel D, is provided with an annular groove T' a portion of whose arc is reversed, at b', forming a cam-groove thereof, clearly shown in Fig. 2, the plate being so set, that the reverse curve in its groove stands horizontally opposite the feeding box, or block receptacle. On the inner end of the sliding arm S, is an anti-friction roller u that is adapted to travel in the cam groove of the plate T, as the wheel D revolves. By means of this construction, the arm S carrying the scoring disks is caused to reciprocate diametrically in the wheel D as the roller u traverses the reverse curve of said groove, whereby said disks are diverted from the arc of the circle described by the wheel D, and are carried across the face of the block, parallel with the grain thereof, thereby forming straight and tough strands of excelsior, when removed by the knives.

Having thus fully set forth our invention, what we claim as new, and desire to secure by Letters Patent, is—

1. In a machine for cutting excelsior, in combination with the cutting-wheel, the block receptacle located adjacent to the face of said wheel, the longitudinally movable bed located in said receptacle, the arm secured to the block receptacle and carrying a spring that engages with said movable bed, whereby said bed is yieldingly held in place substantially as specified.

2. In a machine for cutting excelsior, in combination with the cutting wheel, the block receptacle located adjacent thereto, the longitudinally yielding bed located in said receptacle, the sliding rack and follower mounted upon said bed, the weight-driven shaft journaled to said receptacle and carrying a pinion that engages with said rack substantially as specified.

3. In a machine for cutting excelsior, the combination with the cutting-wheel, of the block receptacle having a longitudinally yielding bed, the rack and follower located in said receptacle, the shaft carrying a pinion that engages with said rack, the weight and pulley for driving said shaft, the belt pulley mounted on said shaft, the parallel shaft, the pulley on said shaft, the loose belt connecting said pulley with the pulley on the weight-driven shaft, and means for tightening said belt to transmit motion from the latter to the former shaft, whereby said weight is raised and the follower withdrawn from the block receptacle, substantially as specified.

4. In a machine for cutting excelsior, the combination of the cutting wheel, the supporting frame, the circular cam-plate adjustably fixed to said frame, the cranked-arm mounted in a diametric way in said wheel and carrying at its inner end an anti-friction roller that engages with said cam-plate, the adjustable hangers mounted in the crank-portion of said arm, the shaft journaled in said hangers and carrying a series of cutting disks, substantially as specified.

In testimony whereof we affix our signatures in presence of two witnesses.

JAMES R. BATE.
SYDNEY H. SHADBOLT.
GEORGE R. HOUGHTON.
CHARLES B. HOUGHTON.

Witnesses:
RALPH BAINBRIDGE,
S. D. REUGLER.